(12) United States Patent
Gibble et al.

(10) Patent No.: US 7,219,267 B2
(45) Date of Patent: May 15, 2007

(54) METHOD, SYSTEM, AND PROGRAM FOR DATA CORRUPTION DETECTION AND FAULT ISOLATION

(75) Inventors: Kevin Lee Gibble, Tucson, AZ (US); James Chien-Chiung Chen, Tucson, AZ (US); Michael Thomas Benhase, Tucson, AZ (US); Minh-Ngoc Le Huynh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 563 days.

(21) Appl. No.: 10/752,758

(22) Filed: Jan. 7, 2004

(65) Prior Publication Data

US 2005/0188279 A1 Aug. 25, 2005

(51) Int. Cl.
*G06F 11/00* (2006.01)
(52) U.S. Cl. .............................. 714/42; 714/52; 714/54
(58) Field of Classification Search .................. 714/42, 714/43, 49, 52, 54, 56, 712, 821
See application file for complete search history.

(56) References Cited

U.S. PATENT DOCUMENTS

| | | | | |
|---|---|---|---|---|
| 5,978,959 | A * | 11/1999 | Hekstra et al. | 714/821 |
| 6,754,853 | B1 * | 6/2004 | DeKoning et al. | 714/42 |
| 6,813,727 | B2 * | 11/2004 | Froeschl et al. | 714/10 |

\* cited by examiner

*Primary Examiner*—Michael Maskulinski
(74) *Attorney, Agent, or Firm*—Janaki K. Davda; Konrad Raynes & Victor LLP (57) ABSTRACT

Disclosed is a technique for fault isolation. A first error check is performed on a block of data in storage to determine whether the block of data was corrupted after the block of data was transferred from memory to the storage. When the first error check indicates that the block of data was corrupted, a second error check is performed using the block of data in the memory to determine whether the block of data was corrupted before being transferred from the memory. When the second error check indicates that the block of data was corrupted before being transferred from the memory, it is determined that the block of data was corrupted before being stored in the memory. When the second error check indicates that the block of data was corrupted after being transferred from the memory, it is determined that the block of data was corrupted by at least one of the memory or a formatter that performed the transfer.

Additionally disclosed is a technique in which a block of data is transferred from a memory at a first control unit to a memory at a second control unit. At the first control unit, when a second error check at the second control unit indicates that the block of data was corrupted before being transferred from the memory, a third error check is performed on the block of data in memory at the first control unit. When the third error check indicates that the block of data was corrupted, it is determined that the block of data was corrupted at the first control unit. When the third error check indicates that the block of data was not corrupted, it is determined that the block of data was corrupted during transfer from the first control unit to the second control unit.

20 Claims, 11 Drawing Sheets

METHOD, SYSTEM, AND PROGRAM FOR DATA CORRUPTION DETECTION AND FAULT ISOLATION

BACKGROUND OF THE INVENTION

1. Field of the Invention

The present invention is directed to data corruption detection and fault isolation.

2. Description of the Related Art

Disaster recovery systems typically address two types of failures, a sudden catastrophic failure at a single point in time or data loss over a period of time. In the second type of gradual disaster, updates to volumes on data storage may be lost. To assist in recovery of data updates, a copy of data may be provided at a remote location. Such dual or shadow copies are typically made as an application system is writing new data to a primary storage device at a primary storage subsystem. The copies are stored in a secondary storage device at a secondary storage subsystem.

During the transfer of data from the primary storage subsystem to the secondary storage subsystem, it is possible for the data being transferred to become corrupted by errors in hardware, in microcode, or in interconnection links between the primary and secondary subsystems.

It is important to detect data corruption as early as possible and to determine where the data corruption took place. For example, in some systems, detecting an error while removing data from cache (e.g., during a destage) at either the primary or secondary subsystem will suspend the primary and secondary storage subsystems, and the data will no longer be in memory in a channel adapter at the primary or secondary subsystem to aid in detecting where the error was introduced.

Some systems solve this problem by calculating and checking a longitudinal redundancy check (LRC) value over data on both the primary and secondary storage subsystems. LRC may be described as an error checking technique that generates a longitudinal parity byte from a specified string or block of bytes (e.g., 512 bytes) on a longitudinal track. At the primary storage subsystem, the generated parity byte is sent with the string or block of bytes to the secondary storage subsystem. When the string or block of bytes are received, the receiving computer regenerates the parity byte and compares the regenerated parity byte to the transmitted parity byte. If the parity bytes do not match, an error is detected. The secondary storage subsystem notifies the primary storage subsystem that an error was detected, and the primary storage subsystem resends the data. Unfortunately, an LRC may be defeated by multiple bit errors and may not detect improperly aligned and/or truncated data transfers.

Also, when conventional systems use LRC to detect data corruption on the secondary storage subsystem, the conventional systems do not isolate where the data corruption originated.

Thus, there is a need in the art for improved data corruption detection and fault isolation.

SUMMARY OF THE INVENTION

Provided are a method, system, and program for fault isolation. A first error check is performed on a block of data in storage to determine whether the block of data was corrupted after the block of data was transferred from memory to the storage. When the first error check indicates that the block of data was corrupted, a second error check is performed using the block of data in the memory to determine whether the block of data was corrupted before being transferred from the memory. When the second error check indicates that the block of data was corrupted before being transferred from the memory, it is determined that the block of data was corrupted before being stored in the memory. When the second error check indicates that the block of data was corrupted after being transferred from the memory, it is determined that the block of data was corrupted by at least one of the memory or a formatter that performed the transfer.

Also provided are a method, system, and program for fault isolation in which a block of data is transferred from a memory at a first control unit to a memory at a second control unit. At the first control unit, when the second error check at the second control unit indicates that the block of data was corrupted before being transferred from the memory, a third error check is performed on the block of data in memory at the first control unit. When the third error check indicates that the block of data was corrupted, it is determined that the block of data was corrupted at the first control unit. When the third error check indicates that the block of data was not corrupted, it is determined that the block of data was corrupted during transfer from the first control unit to the second control unit.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention provide a technique for detecting data corruption and performing fault isolation using an error check (e.g., a cyclic redundancy check (CRC)) over data being transferred. Although examples herein may refer to a CRC technique, implementations of the invention are applicable to any type of error check.

Figure 1A:
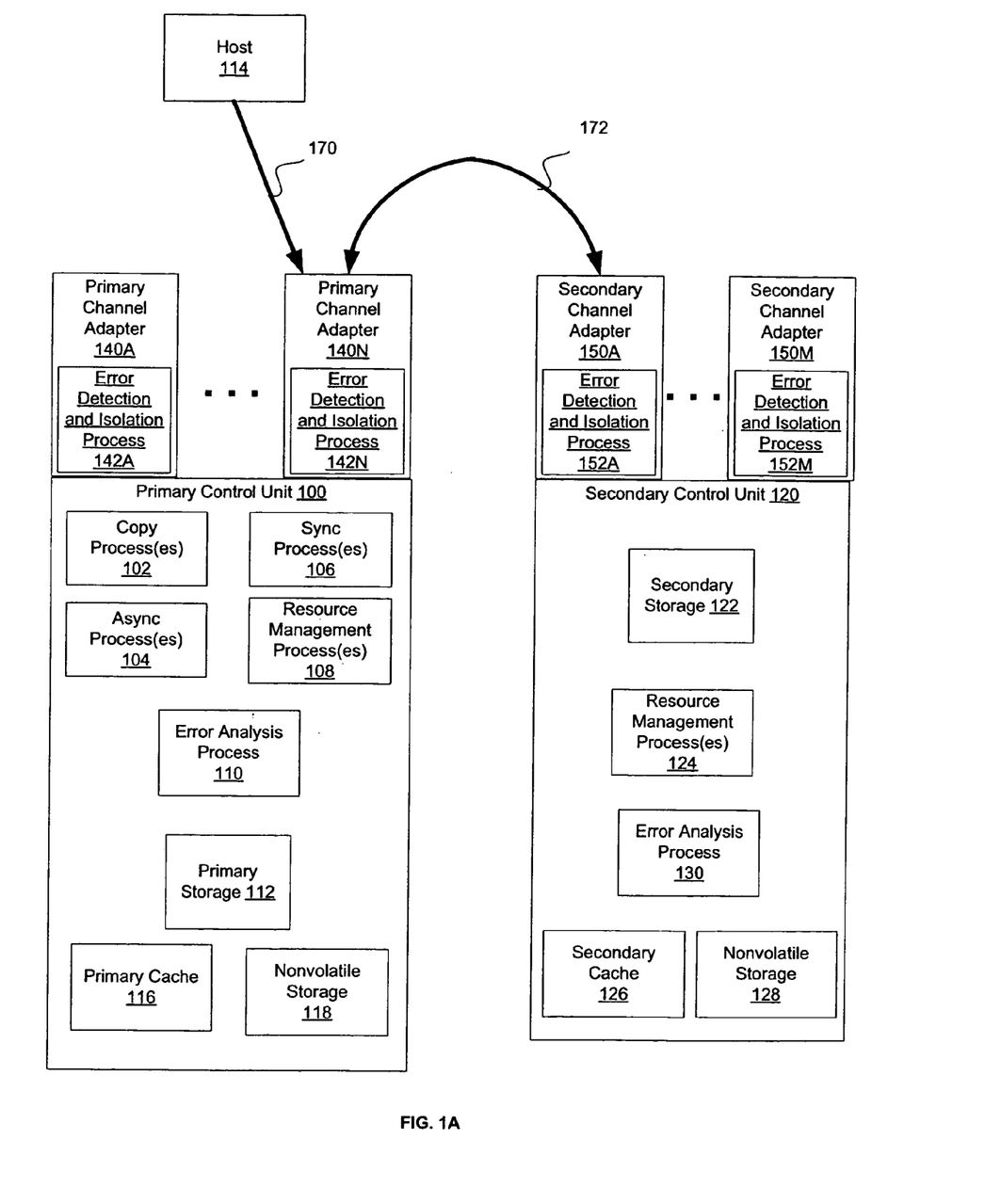
FIG. 1A illustrates, in block diagrams, a computing environment in accordance with certain implementations of the invention.

FIG. 1A illustrates, in block diagrams, a computing environment in accordance with certain implementations of the invention. A primary control unit 100 provides one or more hosts (e.g., host 114) access to primary storage 112, such as Direct Access Storage Device (DASD). The primary storage 112 may be divided into blocks of storage containing blocks of data, and the blocks of storage are further divided into sub-blocks of storage that contain sub-blocks of data. In certain implementations, the blocks of data are contents of tracks, while the sub-blocks of data are contents of sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The primary control unit 100 includes a primary cache 116 in which updates to blocks of data in the primary storage 112 are maintained until written to primary storage 112 (e.g., tracks are destaged). Primary cache 116 may be any type of storage, and the designation of cache illustrates only certain implementations. Additionally, the primary control unit 100 includes a nonvolatile storage 118 (e.g., nonvolatile cache). The nonvolatile storage 118 may be, for example, a battery-backed up volatile memory, to maintain a non-volatile copy of data updates.

The primary control unit 100 may include one or more copy processes 102 (e.g., for executing an establish with copy command), one or more async processes (e.g., for executing an Peer-to-Peer Remote Copy (PPRC) Extended Distance or asynchronous PPRC copy command), and one or more sync processes 106 (e.g., for executing a synchronous PPRC copy command). Each of the processes 102, 104, and 106 transfer blocks of data from the primary control unit 100 to remote storage, such as storage at the secondary control unit 120. In certain implementations, the async process 104 runs continuously for PPRC Extended Distance and asynchronous PPRC commands, and the synch process 106 starts up and completes for a synchronous PPRC command. In certain implementations, there may be different async processes 104 for asynchronous PPRC and for PPRC Extended Distance).

International Business Machines Corporation (IBM), the assignee of the subject patent application, provides several remote mirroring systems, including, for example: a synchronous PPRC service, an asynchronous PPRC service, a PPRC Extended Distance service, or an establish with copy command in an Enterprise Storage Server® (ESS) system. For ease of reference, the synchronous Peer-to-Peer Remote Copy (PPRC) service, asynchronous PPRC service, and PPRC Extended Distance service will be described as providing synchronous PPRC, asynchronous PPRC, and PPRC Extended Distance commands.

The synhcronous PPRC service provides a technique for recovering data updates that occur between a last, safe backup and a system failure with a synchronous PPRC command. Such data shadowing systems can also provide an additional remote copy for non-recovery purposes, such as local access at a remote site. With the synchronous PPRC service, a primary storage subsystem maintains a copy of predefined datasets on a secondary storage subsystem. The copy may be used for disaster recovery. Changes to blocks of data are copied to the secondary storage subsystem as an application updates the blocks of data. Thus, the copy may be used whether there are gradual and/or intermittent failures. The copy is maintained by intercepting write instructions to the synchronous PPRC dataset and generating appropriate write instructions from the primary storage system to the secondary storage system. The write instructions may update a block of data, write a new block of data, or write the same block of data again.

The synchronous PPRC service copies blocks of data to the secondary storage subsystem to keep the blocks of data synchronous with a primary storage subsystem. That is, an application system writes blocks of data to a volume and then transfers the updated blocks of data over, for example, Enterprise System Connection (ESCON®) fiber channels to the secondary storage subsystem. The secondary storage subsystem writes the blocks of data to a corresponding volume. Only when the blocks of data are safely written to volumes at both the primary and secondary storage subsystems does the application system receive assurance that the volume update is complete.

Thus, with synchronous PPRC commands, the copy at the secondary storage subsystem is maintained by intercepting write instructions to the dataset at the primary storage subsystem and generating appropriate write instructions from the primary storage system to the secondary storage system.

For synchronous PPRC, before the host 114 receives an acknowledgment of completion of the write process when writing a chain of tracks to the primary control unit 100, all tracks in the chain are also transferred to the secondary control unit 120 by a sync process 106.

Asynchronous PPRC and PPRC Extended Distance commands do not write to secondary storage subsystem before acknowledging the write to the primary storage subsystem. Instead, for the PPRC Extended Distance service, when a block of data is written, information is stored that indicates that the block of data is to be transferred to the secondary storage subsystem at a later time. An asynchronous process collects updates at the primary storage subsystem and sends the updates to the secondary storage subsystem.

For PPRC Extended Distance, the host 114 may complete writing a track to the primary control unit 100 without the track having been sent to the secondary control unit 120. After the track has been written to the primary control unit 100, the sync process 106 will discover that an indicator corresponding to the track is set to indicate that the track is out of sync with a corresponding track at the secondary control unit 120 and will send the track to the secondary control unit 120. That is, the track is sent asynchronously with respect to the track written by the host.

With an establish with copy command, a copy of a volume at the primary storage subsystem is made at the secondary storage subsystem during an initial copy relationship. After this, updates made to the volume at the primary storage subsystem may be copied to the corresponding copy of the volume at the secondary storage subsystem to keep the copies of the volume in sync.

The primary control unit 100 also includes one or more resource management processes 108 for managing resources and an error analysis process 110 for processing errors.

Channel adaptors 140A . . . 140N allow the primary control unit 100 to interface to communication paths. For ease of reference, A . . . N are used to represent multiple components (e.g., 140A . . . 140N). In certain implementations, channel adaptors 140A . . . 140N may be Fibre channel adaptors, and the communication paths are Fibre channels. Each channel adaptor 140A . . . 140N includes an error detection and isolation process 142A . . . 142N. The error detection and isolation processes 142A . . . 142N perform data corruption detection and fault isolation.

Figure 1B:
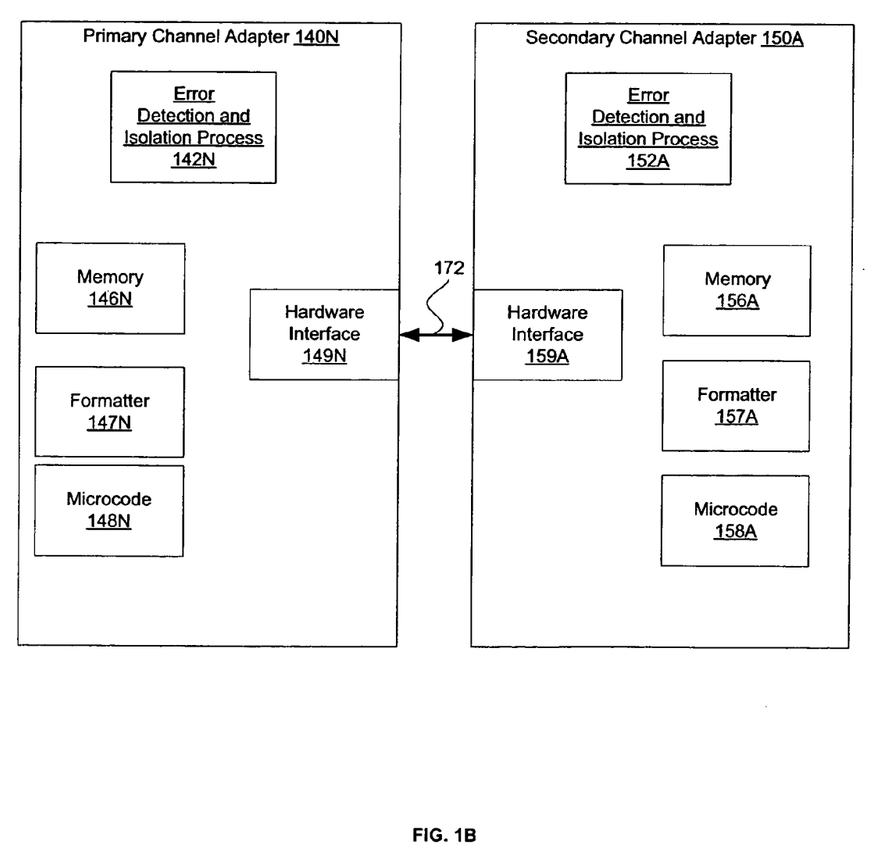
FIG. 1B illustrates, in a block diagram, further details of channel adapters in accordance with certain implementations of the invention.

FIG. 1B illustrates, in a block diagram, further details of channel adapters 140N, 150A in accordance with certain implementations of the invention. Although, channel adapters 140N and 150A are illustrated, any channel adapter 140A . . . 140N, 150A . . . 150M may have the architecture of 104N or 15A illustrated in FIG. 1B. Each channel adapter 140N . . . 140N, 150A . . . 150M may also include other components not shown in FIG. 1B.

In addition to error detection and isolation process 142N, primary channel adapter 140N includes memory 146N, formatter 147N, microcode 148N, and hardware interface 149N. The memory 146N may be used to store data. The formatter 147N moves data from and into memory 146N. The microcode 148N performs error processing. The hardware interface 149N supports the communication path 172.

In addition to error detection and isolation process 152A, secondary channel adapter 150A includes a memory 156A, formatter 157A, microcode 158A, and hardware interface 159A. The memory 156N may be used to store data. The formatter 157N moves data from and into memory 156N. The microcode 158N performs error processing. The hardware interface 159N supports the communication path 172.

Figure 1C:
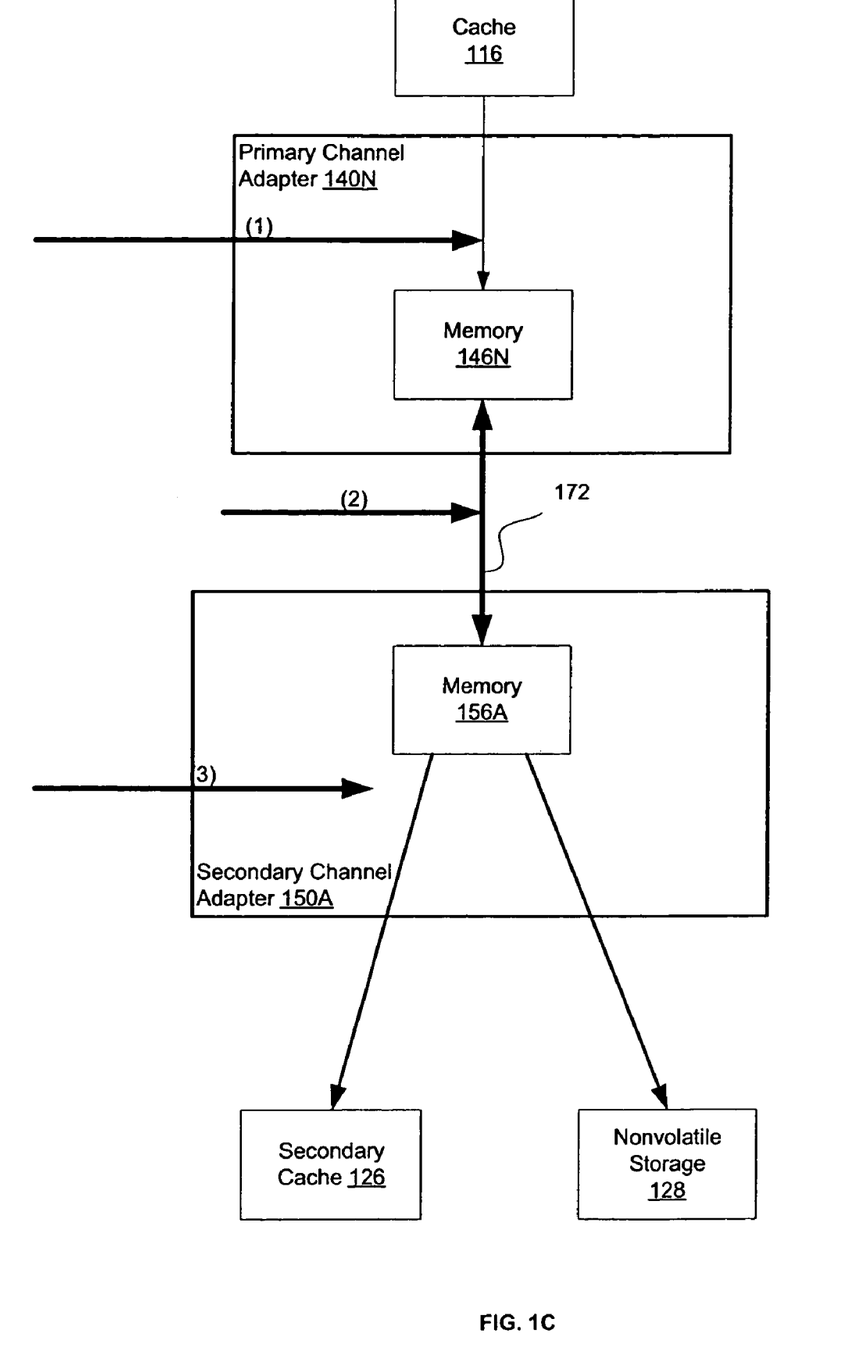
FIG. 1C illustrates, in a block diagram, flow of data between channel adapters in accordance with certain implementations of the invention.

FIG. 1C illustrates, in a block diagram, flow of data between channel adapters in accordance with certain implementations of the invention. When a block of data is to be sent from primary control unit 100 to secondary control unit 120, the block of data is stored in primary cache 116 until the primary channel adapter 140N is ready to send the block of data over a communication path. At this time, the block of data is moved from primary cache 116 to memory 146N by formatter 147N. Then, the block of data is sent from memory 146N to memory 156A via hardware interface 159N and communication path 172.

When the block of data sent from primary channel adapter 140N is received at secondary channel adapter 150A, the block of data is stored in memory 156A. The block of data is transferred from memory 156A to secondary cache 126 and nonvolatile storage 128 by formatter 157A. The block of data may be transferred to secondary cache 126 and nonvolatile storage 128 in any order or simultaneously.

Implementations of the invention detect data corruption and also isolate whether the data corruption occurred at (1) the primary channel adapter 140N, (2) on the communication path 174, or (3) at the secondary channel adapter 150M.

In certain implementations, the processes 102, 104, 106, 108, 110, and 142A . . . 142N are implemented as firmware. In certain implementations, the processes 102, 104, 106, 108, 110, and 142A . . . 142N are implemented in a combination of firmware and software. In certain implementations, the processes 102, 104, 106, 108, 110, and 142A . . . 142N are implemented as separate software programs for each process 102, 104, 106, 110, and 142A. . . . 142N. In certain implementations, the processes 102, 104, 106, 108, 110, and 142A . . . 142N may be combined with each other or other software programs (e.g., the async processes 104 and sync processes 106 may be combined with each other).

Secondary control unit 120 allows access to disk storage, such as secondary storage 122, which maintains back-up copies of all or a subset of the volumes of the primary storage 112. Secondary storage may be a Direct Access Storage Device (DASD). Secondary storage 122 is also divided into blocks of storage containing blocks of data, and the blocks of storage are further divided into sub-blocks of storage that contain sub-blocks of data. In certain implementations, the blocks of data are tracks, while the sub-blocks of data are sectors of tracks. For ease of reference, the terms tracks and sectors will be used herein as examples of blocks of data and sub-blocks of data, but use of these terms is not meant to limit the technique of the invention to tracks and sectors. The techniques of the invention are applicable to any type of storage, block of storage or block of data divided in any manner.

The secondary control unit 120 includes a secondary cache 126 in which updates to blocks of data in the secondary storage 122 are maintained until written to secondary storage 122 (e.g., tracks are destaged). Secondary cache 126 may be any type of storage, and the designation of cache illustrates only certain implementations. Additionally, the secondary control unit 120 includes a nonvolatile storage 128 (e.g., nonvolatile cache). The nonvolatile storage 128 may be, for example, a battery-backed up volatile memory, to maintain a non-volatile copy of data updates.

The secondary control unit 120 also includes one or more resource management processes 124 for managing resources and an error analysis process 130 for processing errors.

For ease of reference, A . . . M are used to represent multiple components (e.g., 150A . . . 150M). Channel adaptors 150A . . . 150M allow the secondary control unit 120 to interface to communication paths. For ease of reference, A . . . N are used to represent multiple components (e.g., 150A . . . 150M). In certain implementations, channel adaptors 150A . . . 150M may be Fibre channel adaptors, and the communication paths are Fibre channels. Each channel adaptor 150A . . . 150M includes an error detection and isolation process 152A . . . 150M. The error detection and isolation processes 152A . . . 150M perform data corruption detection and fault isolation.

In certain implementations, the processes 124, 130, and 152A . . . 150M are implemented as firmware. In certain implementations, the processes 124, 130, and 152A . . . 150M are implemented in a combination of firmware and software. In certain implementations, the processes 124, 130, and 152A . . . 150M are implemented as separate software programs for each process 124, 130, and 152A . . . 150M. In certain implementations, the processes 124, 130, and 152A . . . 150M may be combined with each other or other software programs.

Although for ease of illustration, only a communication paths 170 and 172 are illustrated, there may be communication paths between host 114 and each primary channel adapter 140A . . . 140N and between primary channel adapters 140A . . . 140N and secondary channel adapters 150A . . . 150M.

In certain implementations, communication paths (e.g., 172) between channel adapters 140A . . . 140N and 150A . . . 150M are bidirectional. Also, either control unit 100 or 120 may be designated a primary control unit, and the other control unit may be designated as a secondary control unit for certain commands. For example, control unit 100 may be designated as a primary control unit 120 for an asynchronous PPRC command, while control unit 120 may be designated as a primary control unit 120 for an establish with copy command (e.g., to make an initial copy of a volume).

Thus, a channel adaptor 140A . . . 140N may receive I/O requests from communication path 170 or communication path 172. In certain implementations, the I/O requests may include, for example, host I/O commands, asynchronous PPRC commands, Extended Distance PPRC commands, synchronous PPRC commands, and establish with copy commands.

In certain implementations, the primary control unit 100 and secondary control unit 120 communicate via communication paths, such as direct high speed transmission lines (e.g., an Enterprise System Connection (ESCON®)link). However, the communication paths may be comprised of any other communication means known in the art, including network transmission lines, fiber optic cables, etc., as long as the primary control unit 100 and secondary control unit 120 are able to communicate with each other In certain implementations, the primary control unit 100 and secondary control unit 120 may be comprised of the IBM® 3990, Model 6 Storage Controller, Enterprise Storage Server®, or any other control unit known in the art, as long as the primary control unit 100 and secondary control unit 120 are able to communicate with each other.

In certain implementations, the primary control unit 100 and/or secondary control unit 120 may comprise any computing device known in the art, such as a mainframe, server, personal computer, workstation, laptop, handheld computer, telephony device, network appliance, virtualization device, storage controller, etc.

A primary site may include multiple primary control units, primary storage, and host computers. A secondary site may include multiple secondary control units, and secondary storage.

In certain implementations of the invention, data is maintained in volume pairs. A volume pair is comprised of a volume in a primary storage device (e.g., primary storage 112) and a corresponding volume in a secondary storage device (e.g., secondary storage 122) that includes a consistent copy of the data maintained in the primary volume. For example, primary storage 112 may include VolumeA and VolumeB, and secondary storage 122 may contain corresponding VolumeX and VolumeY, respectively.

In certain implementations, removable and/or non-removable storage (instead of or in addition to remote storage, such as secondary storage 122) may be used to maintain back-up copies of all or a subset of the primary storage 112, and the techniques of the invention transfer blocks of data to the removable and/or non-removable storage rather than to the remote storage. The removable and/or non-removable storage may reside at the primary control unit 100.

Figure 2:
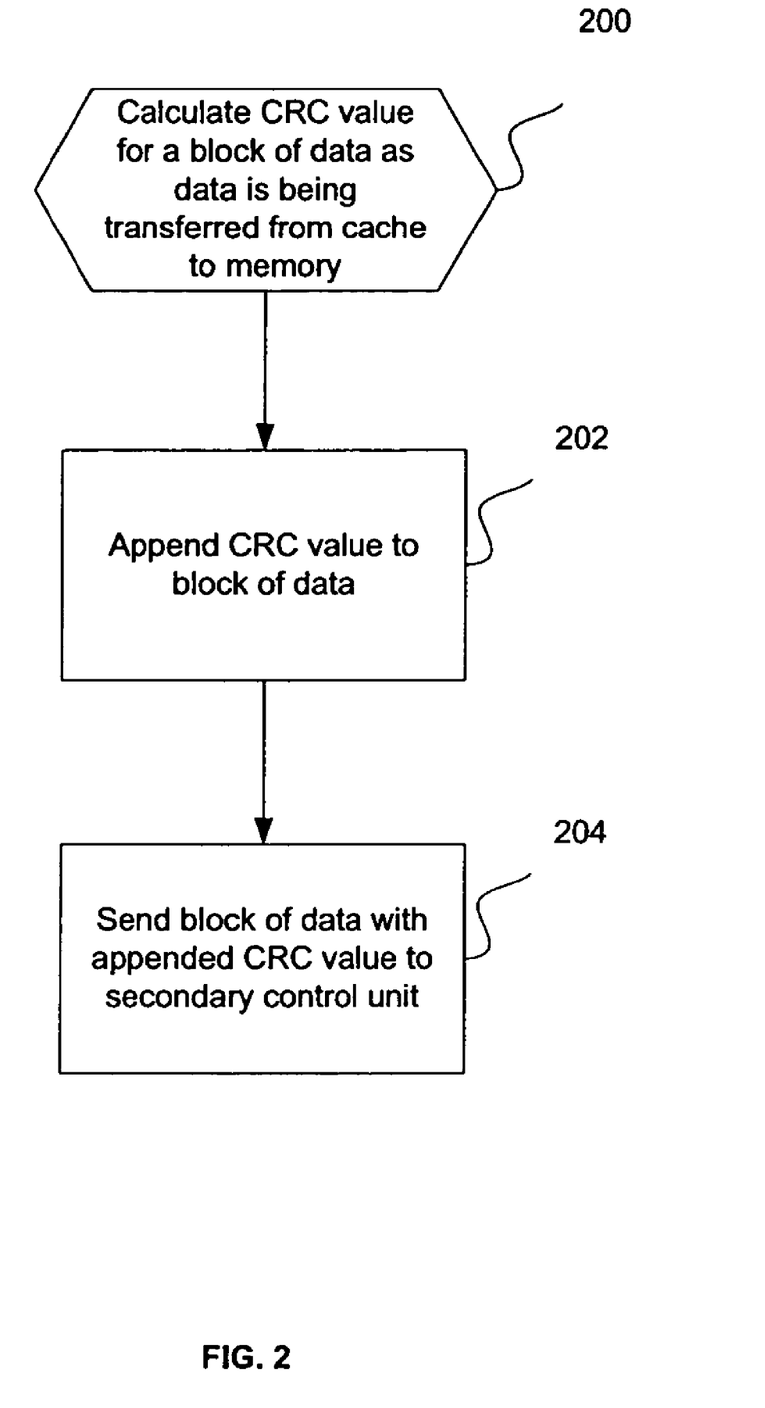
FIG. 2 illustrates logic implemented in a primary channel adapter 140A . . . 140N at a primary control unit 100 when sending a block of data to a secondary control unit in accordance with certain implementations of the invention.

FIG. 2 illustrates logic implemented in a primary channel adapter 140A . . . 140N at a primary control unit 100 when sending a block of data to a secondary control unit 120 in accordance with certain implementations of the invention. Control begins in block 200 with the error detection and isolation process 142A . . . 142N calculating a CRC value for a block of data as the block of data is being transferred from cache to memory in primary channel adapter 140A . . . 140N. With CRC, a messages to be transmitted are divided into predetermined lengths, which are divided by a fixed divisor, and the remainder numbers are appended onto and sent with the messages. When a message is received, the receiving computer recalculates the remainder and compares the recalculated remainder to the transmitted remainder. If the remainders do not match, a CRC error is detected.

In block 202, the error detection and isolation process 142A . . . 142N appends the CRC value to the block of data. In block 204, the formatter 147N at the primary channel adapter 140A . . . 140N sends the block of data to the secondary control unit 120 via a secondary channel adapter 150A . . . 150M.

Figure 3A:
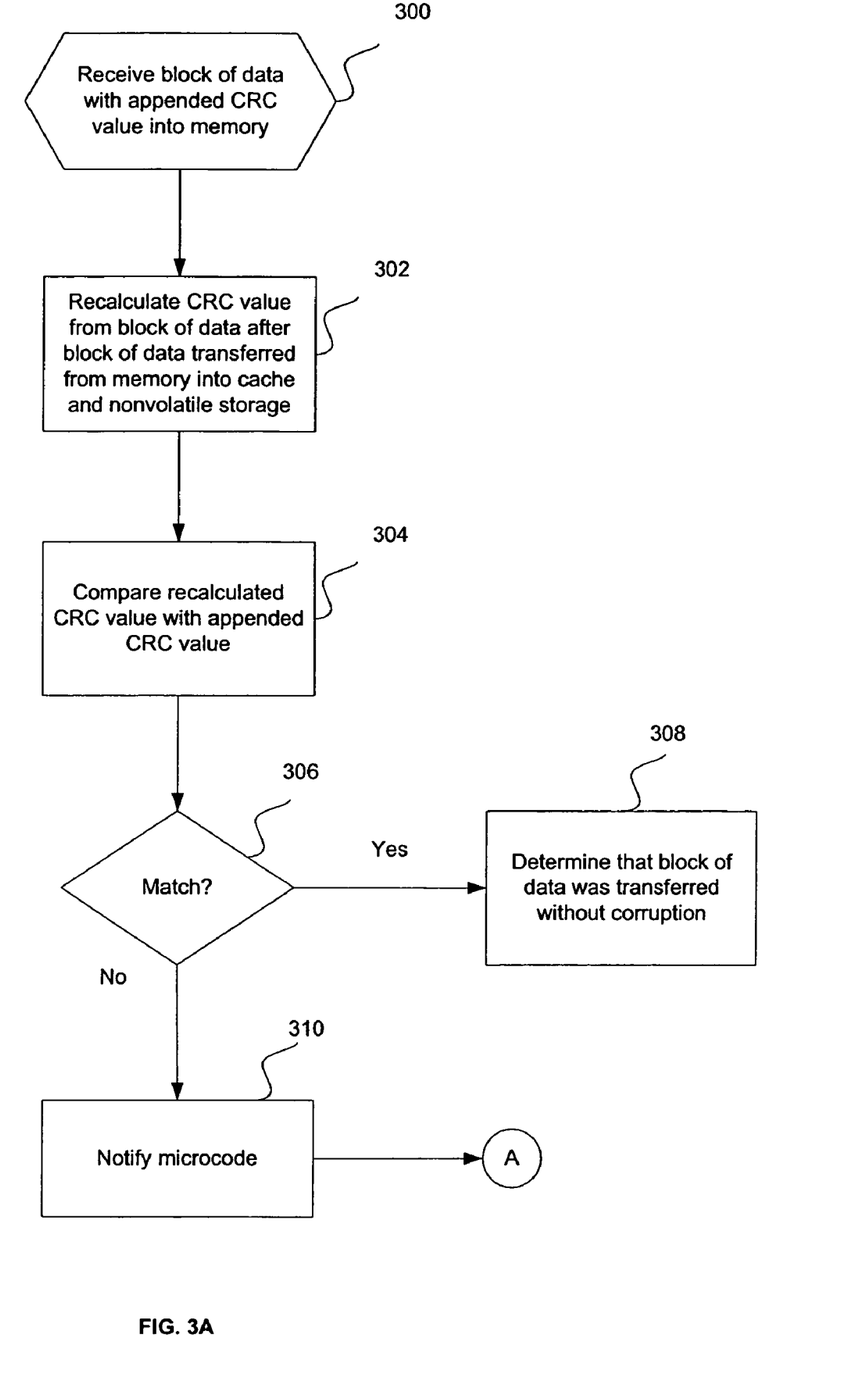
FIGS. 3A, 3B, and 3C illustrate logic implemented in a secondary channel adapter at a secondary control unit in accordance with certain implementations of the invention.
Figure 3B:
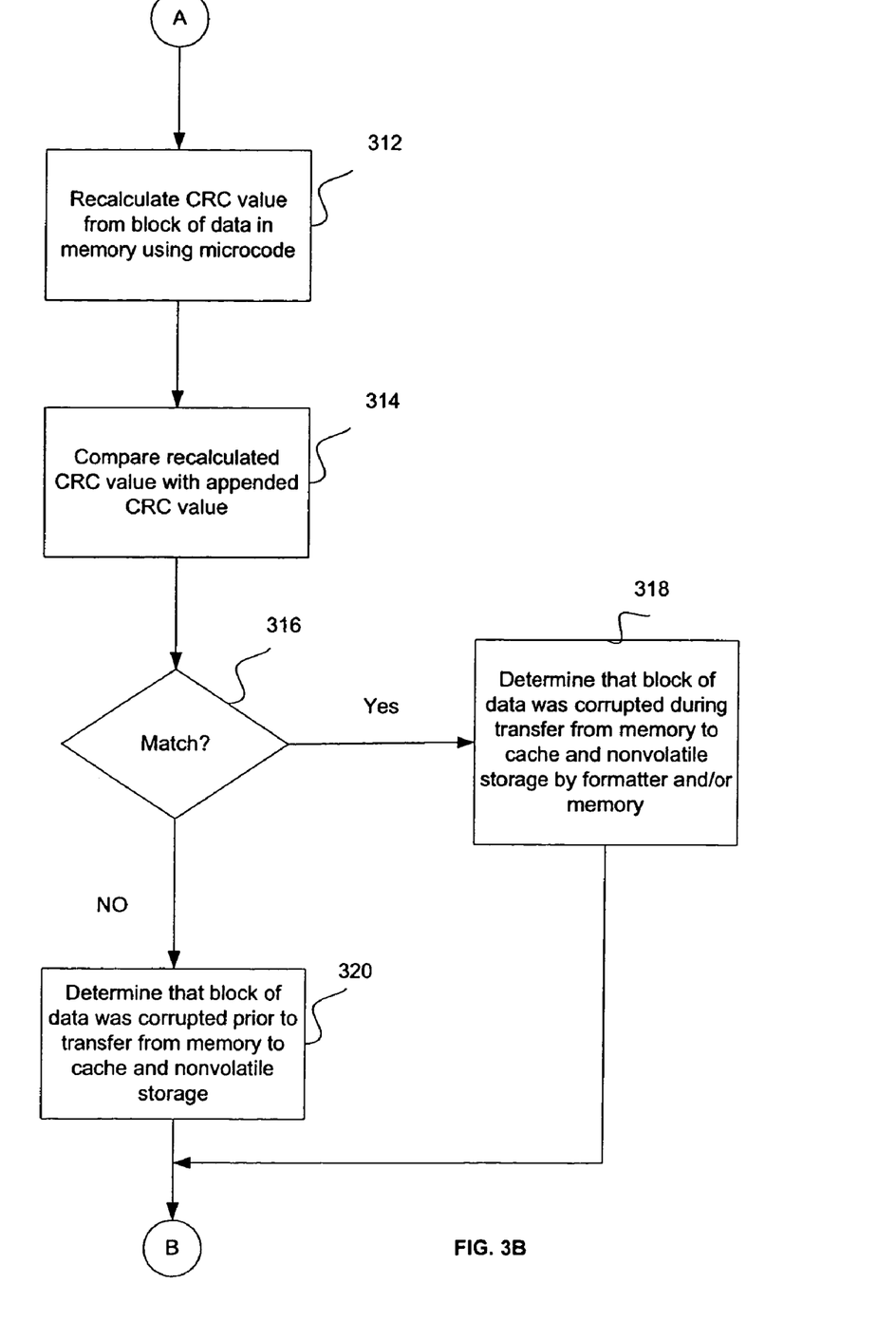
Figure 3C:
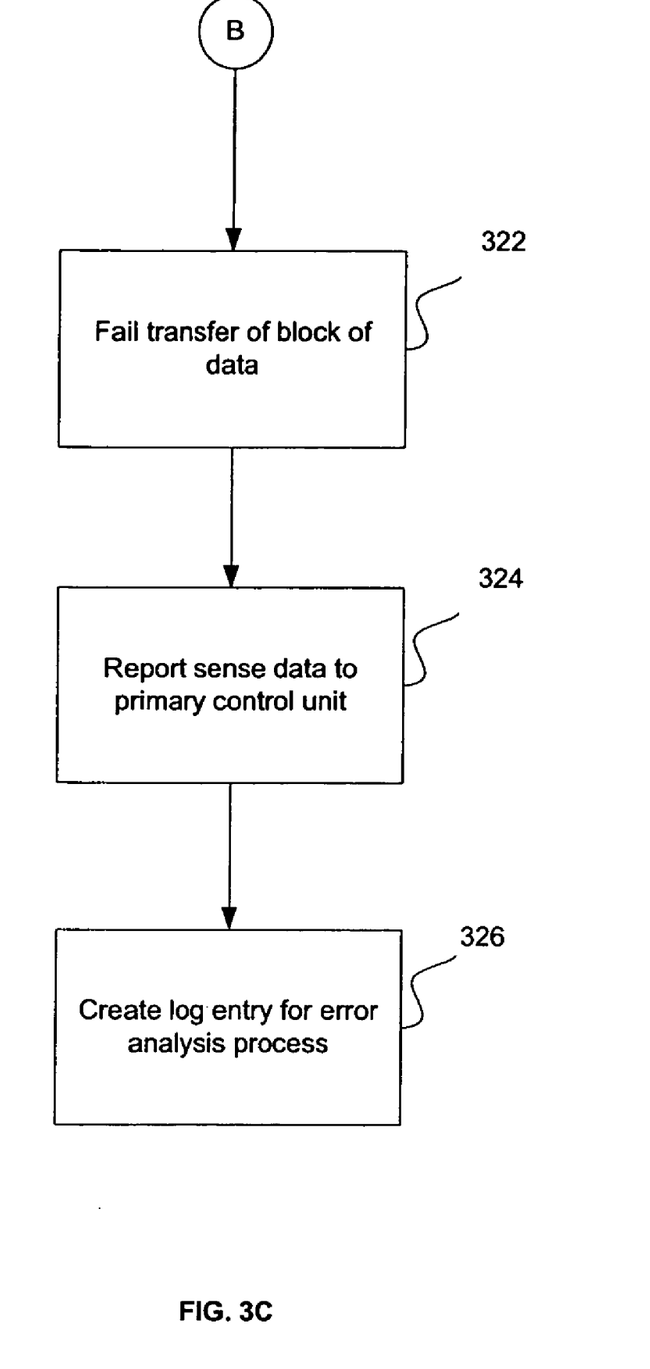

FIGS. 3A, 3B, and 3C illustrate logic implemented in a secondary channel adapter 150A . . . 150M at a secondary control unit 120 in accordance with certain implementations of the invention. Control begins at block 300 with the secondary channel adapter 150A . . . 150M receiving a block of data with an appended CRC value into memory (e.g., 156A at secondary channel adapter 150A). In block 302, the error detection and isolation process 152A . . . 150M recalculates the CRC value from the block of data in cache 126 and/or nonvolatile storage 128 after the formatter (e.g., 157A at secondary channel adapter 150A) transfers the block of data from memory into secondary cache 126 and into nonvolatile storage 128.

In block 304, the error detection and isolation process 152A . . . 150M compares the calculated CRC value with the appended CRC value. In block 306, if there is a match between the calculated CRC value and the appended CRC value, processing continues to block 308, otherwise, processing continues to block 310. In block 308, the error detection and isolation process 152A . . . 150M determines that the block of data was transferred from the primary control unit 100 without data corruption.

In block 310, the error detection and isolation process 152A . . . 150M notifies the microcode (e.g., microcode 158A at secondary channel adapter 150A) that a CRC error was detected in the block of data. In block 312, the microcode recalculates the CRC value from the block of data in memory. In block 314, the microcode compares the recalculated CRC value with the appended CRC value. In block 316, if there is a match between the calculated CRC value and the appended CRC value, processing continues to block 318, otherwise, processing continues to block 320.

In block 318, the microcode determines that the block of data was corrupted during transfer from memory to cache and nonvolatile storage and determines that the corruption was caused by the formatter and/or memory at the secondary channel adapter 150A . . . 150M. In certain implementations, the secondary channel adapter 150A . . . 150M may attempt to retransfer the block of data from the memory to the cache and to nonvolatile storage for a specified number of tries in addition to or instead of requesting the block of data from the primary control unit 100 by reporting an error.

In block 320, the microcode determines that the block of data was corrupted prior to transfer from memory to cache and nonvolatile storage. In this case, additional analysis is performed by the primary channel adapter 140A . . . 140N, as will be described with reference to FIGS. 4A, 4B, and 4C.

In block 322, microcode fails transfer of the block of data. In block 324, the microcode reports sense data to the primary control unit 100. The sense data includes, for example, the determination made in either block 318 or 320. In block 326, the microcode creates a log entry for use by the error analysis process 130 at the secondary control unit. The log entry includes, for example, (1) the determination made in either block 318 or 320; (2) a world wide port name (wwpn) of the primary control unit 100 that sent the block of data; (3) identifiers of a secondary channel adapter 150A . . . 150M and a port that detected the CRC error; (4) a volume identifier and a track identifier (when volumes and tracks are used for storage) on which the CRC error was detected; (5) and an indication of whether the CRC error was detected on the transfer of the block of data from memory to the cache or on the transfer of the block of data from memory to nonvolatile storage.

Figure 4A:
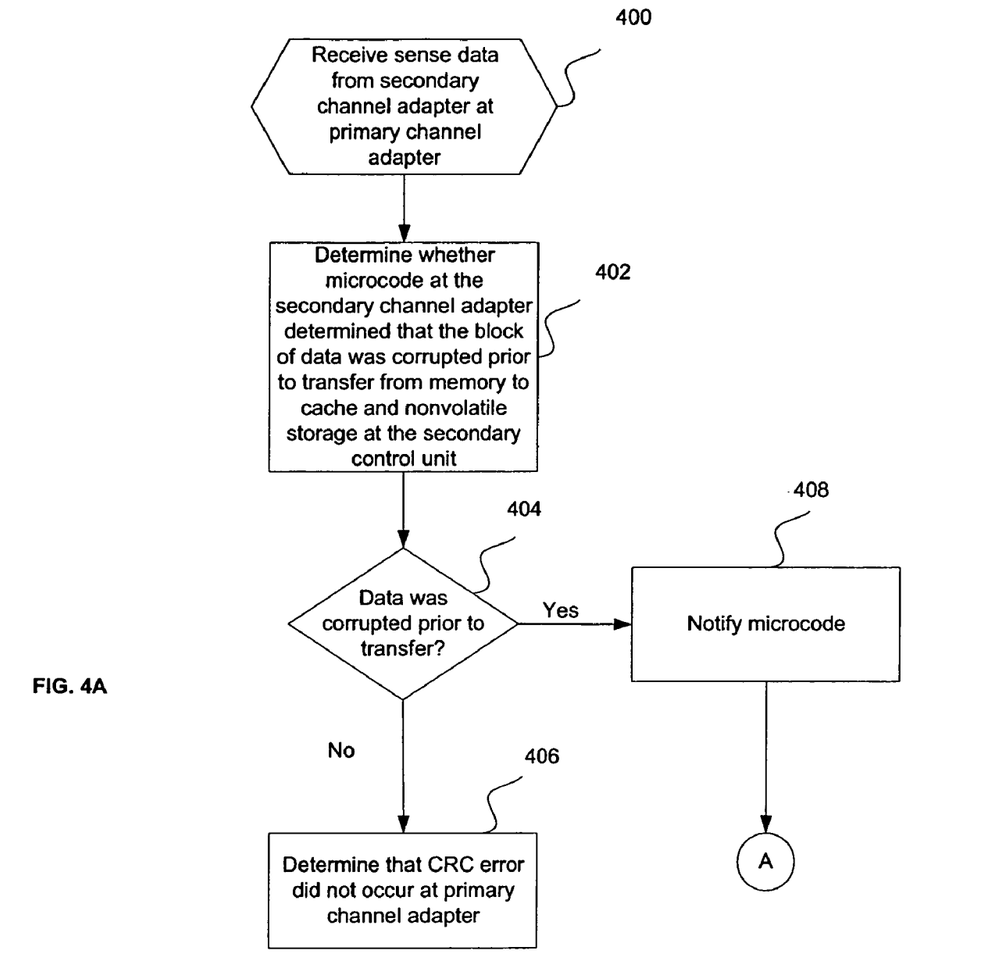
FIGS. 4A, 4B, and 4C illustrate logic implemented in a primary channel adapter when a secondary channel adapter has detected data corruption at a primary control unit in accordance with certain implementations of the invention.
Figure 4B:
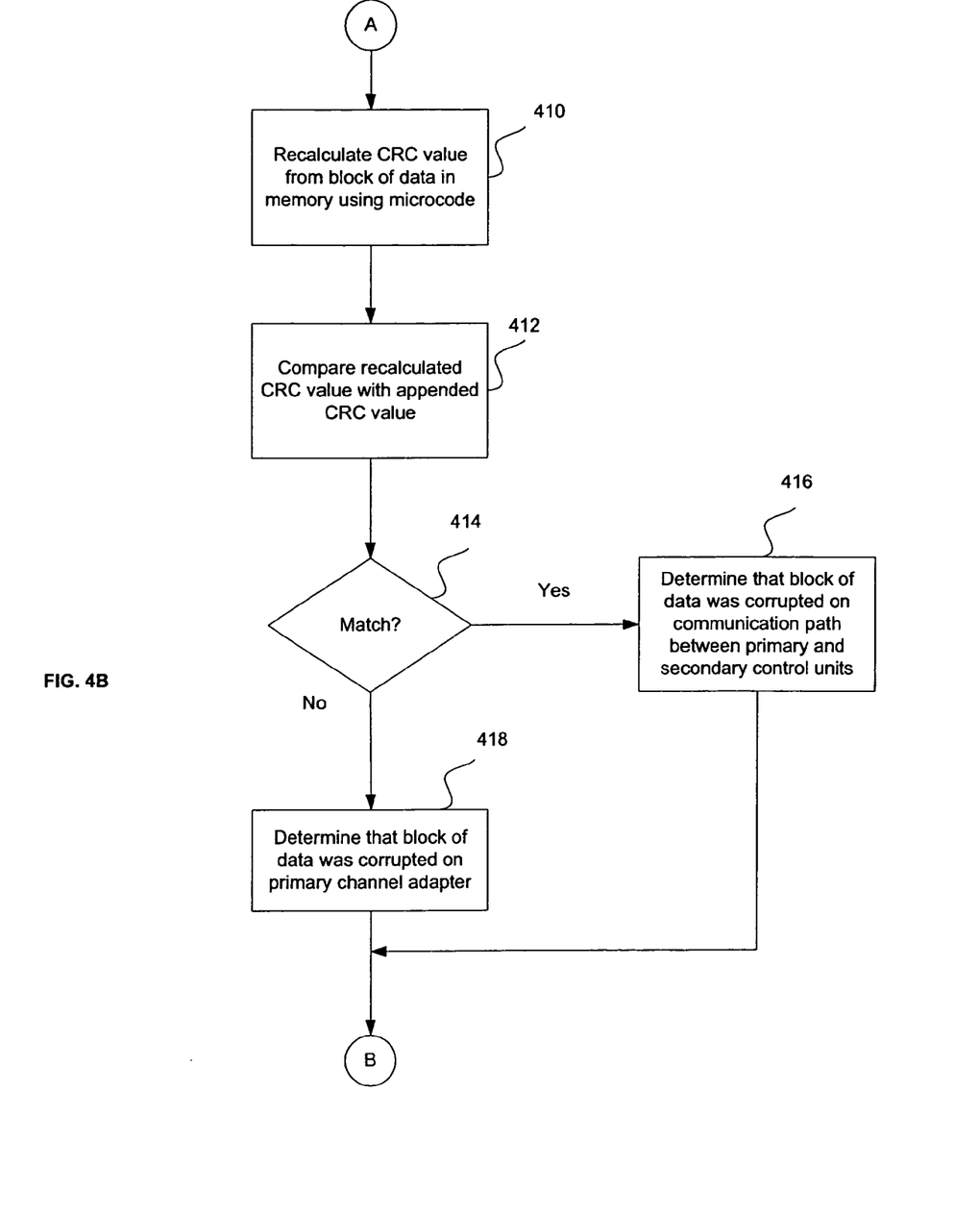
Figure 4C:
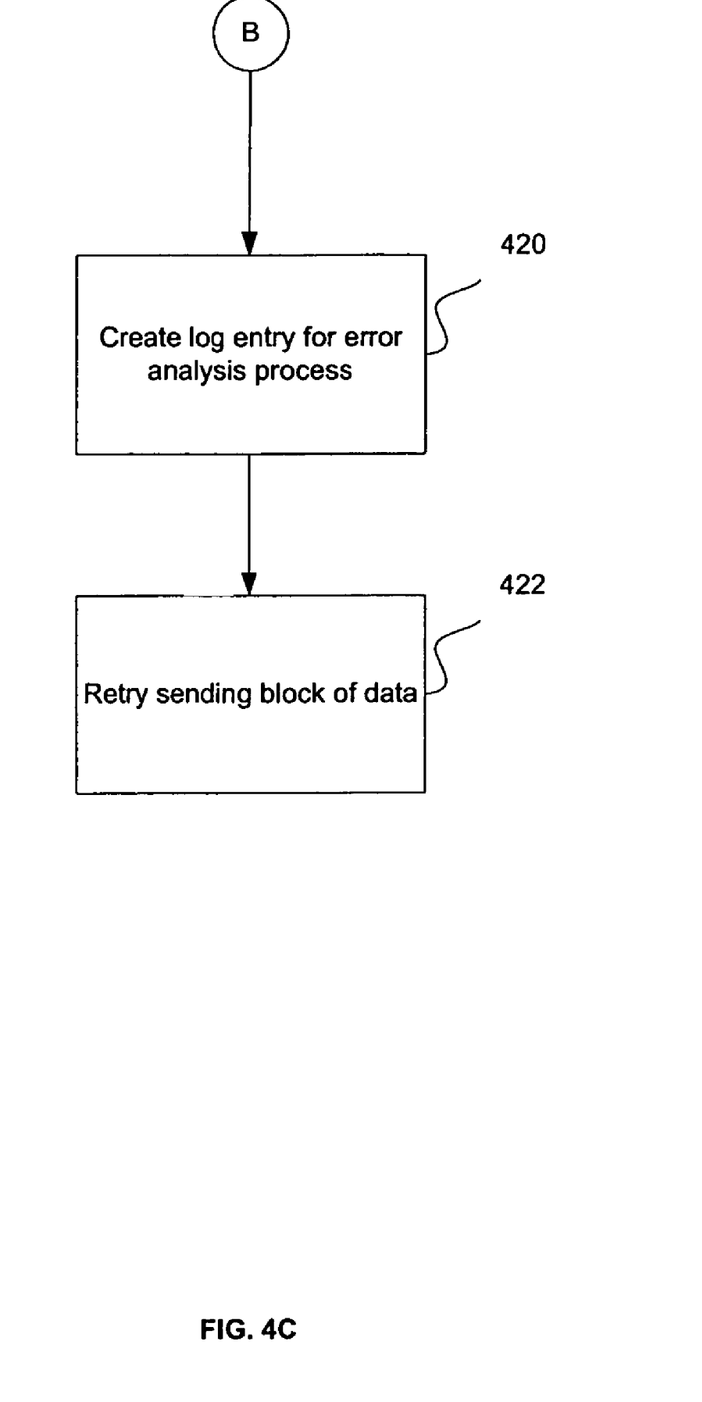

FIGS. 4A, 4B, and 4C illustrate logic implemented in a primary channel adapter 140A . . . 140N at a primary control unit 100 when a secondary channel adapter 150A . . . 150M has detected data corruption in accordance with certain implementations of the invention. Control begins at block 400 with a primary channel adapter 140A . . . 140N receiving sense data from a secondary channel adapter 150A . . . 150M. In block 402, the error detection and isolation process 142A . . . 142N determines whether microcode (e.g., 158A at secondary channel adapter 150A) at the secondary channel adapter 150A . . . 150M determined that the block of data was corrupted prior to transfer from memory 156A to secondary cache 126 and nonvolatile storage 128 at the secondary control unit 120. This information is available in the sense data. In block 404, if the block of data was corrupted prior to transfer, processing continues to block 408, otherwise, processing continues to block 406. In block 406, the error detection and isolation process 142A . . . 142N determines that the CRC error did not occur at the primary channel adapter 140A . . . 140N.

In block 408, the error detection and isolation process 142A . . . 142N notifies the microcode (e.g., microcode 148N at primary channel adapter 140N) that a CRC error was detected in a block of data. In block 410, the microcode recalculates the CRC value from the block of data in memory (e.g., memory 146N at primary channel adapter 140N). In certain implementations, a block of data is stored in memory at the primary channel adapter 140A . . . 140N until the block of data is successfully transferred to a secondary adapter channel 150A . . . 150M.

In block 412, the microcode compares the recalculated CRC value with the appended CRC value. In block 414, if there is a match between the calculated CRC value and the appended CRC value, processing continues to block 416, otherwise, processing continues to block 418. In block 416, the microcode determines that the block of data was corrupted on the communication path 172 between the primary control unit 100 and secondary control unit 120. In block 418, the microcode determines that the block of data was corrupted in the primary channel adapter 140A . . . 142N.

In block 420, microcode creates a log entry for use by the error analysis process 130 at the secondary control unit. The log entry includes, for example, (1) the determination made in either block 416 or 418; (2) a world wide port name (wwpn) of the secondary control unit 120 that sent the block of data; (3) identifiers of a primary channel adapter 140A . . . 140N and port that sent the block of data; (4) a volume identifier and a track identifier (when volumes and tracks are used for storage) on which the CRC error was detected; (5) and the determination reported by the secondary channel adapter 150A . . . 150M (i.e., an indication of whether the CRC error was detected on the transfer of the block of data from memory to the cache or on the transfer of the block of data from memory to nonvolatile storage.

In block 422, the primary control unit 100 retries sending the block of data to the secondary control unit.

Thus, implementations of the invention use CRC, which is very robust and is able to detect multiple bit errors and incorrect transfer lengths. When a CRC error is detected, implementations of the invention use the calculated CRC comparisons to provide better fault isolation. That is, microcode at both primary and secondary channel adapters perform checks. Also, implementations of the invention improve fault isolation analysis by having the secondary control unit 120 send problem isolation information back to the primary control unit 100, which may use the information in conjunction with local information to determine where the error occurred. Unlike conventional systems that use custom hardware to perform LRC, implementations of the invention may be used by systems that do not have custom hardware.

IBM, Enterprise Storage Server, and ESCON are registered trademarks or common law marks of International Business Machines Corporation in the United States and/or foreign countries.

Additional Implementation Details

The described techniques for data corruption detection and fault isolation may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2, 3A, 3B, 3C, 4A, 4B, and 4C describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2, 3A, 3B, 3C, 4A, 4B, and 4C may be implemented in software, hardware, programmable and non-programmable gate array logic or in some combination of hardware, software, or gate array logic.

Figure 5:
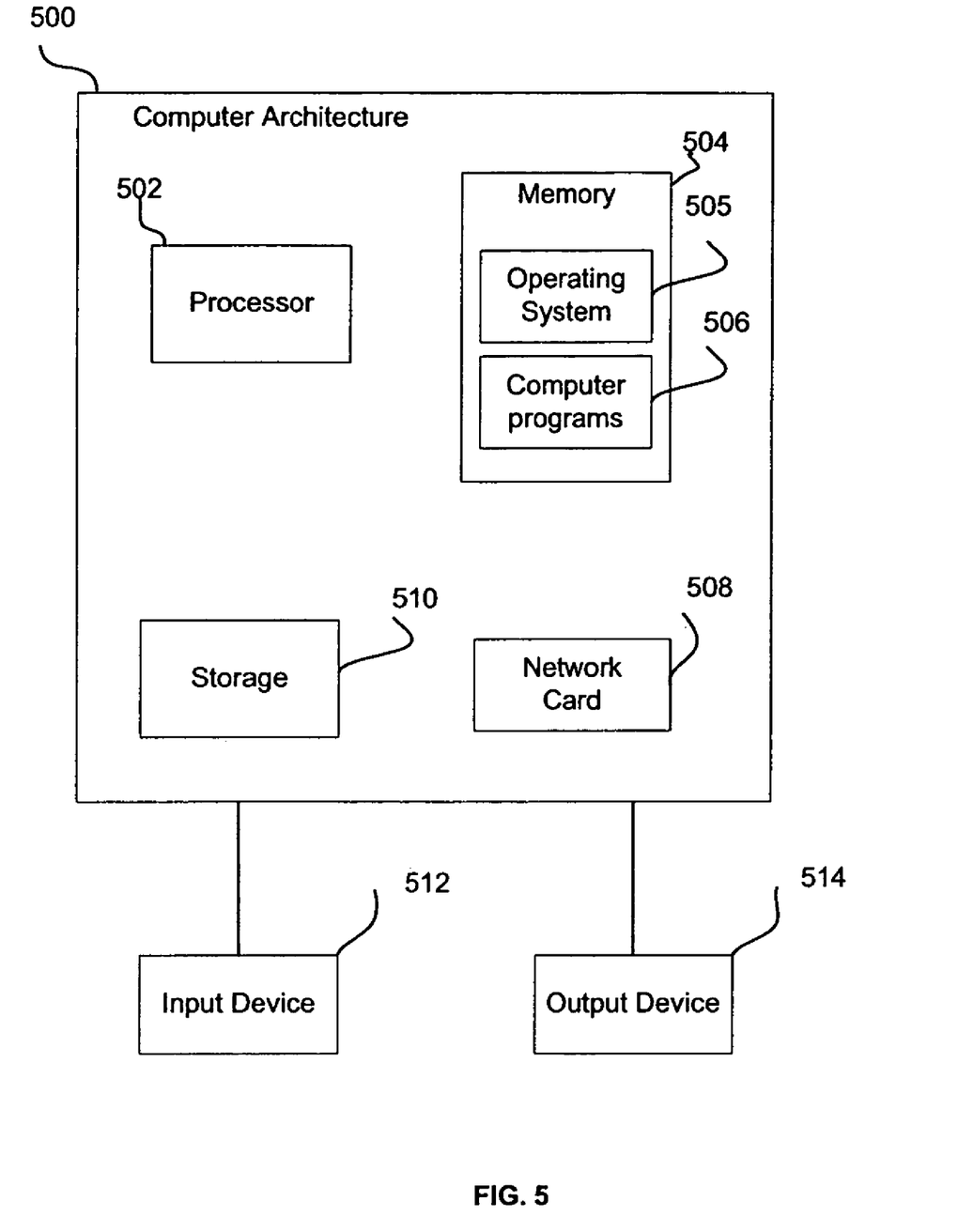
FIG. 5 illustrates one implementation of the architecture of computer systems in accordance with certain implementations of the invention.

FIG. 5 illustrates an architecture 500 of a computer system that may be used in accordance with certain implementations of the invention. Host 114, primary control unit 100, and/or secondary control unit 120 may implement computer architecture 500. The computer architecture 500 may implement a processor 502 (e.g., a microprocessor), a memory 504 (e.g., a volatile memory device), and storage 510 (e.g., a non-volatile storage area, such as magnetic disk drives, optical disk drives, a tape drive, etc.). An operating system 505 may execute in memory 504. The storage 510 may comprise an internal storage device or an attached or network accessible storage. Computer programs 506 in storage 510 may be loaded into the memory 504 and executed by the processor 502 in a manner known in the art. The architecture further includes a network card 508 to enable communication with a network. An input device 512 is used to provide user input to the processor 502, and may include a keyboard, mouse, pen-stylus, microphone, touch sensitive display screen, or any other activation or input mechanism known in the art. An output device 514 is capable of rendering information from the processor 502, or other component, such as a display monitor, printer, storage, etc. The computer architecture 500 of the computer systems may include fewer components than illustrated, additional components not illustrated herein, or some combination of the components illustrated and additional components.

The computer architecture 500 may comprise any computing device known in the art, such as a mainframe, server, personal computer, workstation, laptop, handheld computer, telephony device, network appliance, virtualization device, storage controller, etc. Any processor 502 and operating system 505 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for fault isolation, comprising:
   performing a first error check on a block of data in storage to determine whether the block of data was corrupted after the block of data was transferred from memory to the storage;
   when the first error check indicates that the block of data was corrupted, performing a second error check using the block of data in the memory to determine whether the block of data was corrupted before being transferred from the memory;
   when the second error check indicates that the block of data was corrupted before being transferred from the memory, determining that the block of data was corrupted before being stored in the memory; and
   when the second error check indicates that the block of data was corrupted after being transferred from the memory, determining that the block of data was corrupted by at least one of the memory or a formatter that performed the transfer.

2. The method of claim 1, wherein the storage is at least one of cache and nonvolatile storage.

3. The method of claim 1, wherein the block of data is transferred from a first control unit to the memory at a second control unit and further comprising:
   when the first error check indicates that the block of data was not corrupted, determining that the block of data was transferred from the first control unit to the second control unit without being corrupted.

4. The method of claim 1, wherein when the second error check indicates that the block of data was corrupted before being transferred from the memory, further comprising:
   retrying the transfer of the block of data from the memory to the storage.

5. The method of claim 1, wherein the block of data is transferred from a memory at a first control unit to the memory at a second control unit, further comprising:
   when the second error check indicates that the block of data was corrupted,
      failing the transfer of the block of data by sending sense data to the first control unit; and
      creating a log entry for error analysis.

6. The method of claim 5, further comprising:
   at the first control unit,
      when the second error check indicates that the block of data was corrupted before being transferred from the memory, performing a third error check on the block of data in memory at the first control unit;
      when the third error check indicates that the block of data was corrupted, determining that the block of data was corrupted at the first control unit;
      when the third error check indicates that the block of data was not corrupted, determining that the block of data was corrupted during transfer from the first control unit to the second control unit; and
      creating a log entry for error analysis.

7. The method of claim 5, further comprising:
   at the first control unit, resending the block of data to the second control unit.

8. The method of claim 1, wherein the first error check, the second error check, and the third error check are each made using a cyclic redundancy check.

9. An article of manufacture embodied as one of hardware logic and a computer readable storage medium including program logic for fault isolation, wherein the hardware logic or program logic when executed by a computer causes operations to be performed, the operations comprising:
   performing a first error check on a block of data in storage to determine whether the block of data was corrupted after the block of data was transferred from memory to the storage;
   when the first error check indicates that the block of data was corrupted, performing a second error check using the block of data in the memory to determine whether the block of data was corrupted before being transferred from the memory;
   when the second error check indicates that the block of data was corrupted before being transferred from the memory, determining that the block of data was corrupted before being stored in the memory; and
   when the second error check indicates that the block of data was corrupted after being transferred from the memory, determining that the block of data was corrupted by at least one of the memory or a formatter that performed the transfer.

10. The article of manufacture of claim 9, wherein the storage is at least one of cache and nonvolatile storage.

11. The article of manufacture of claim 9, wherein the block of data is transferred from a first control unit to the memory at a second control unit and wherein the operations further comprise:
    when the first error check indicates that the block of data was not corrupted, determining that the block of data was transferred from the first control unit to the second control unit without being corrupted.

12. The article of manufacture of claim 9, wherein when the second error check indicates that the block of data was corrupted before being transferred from the memory, and wherein the operations farther comprise:
    retrying the transfer of the block of data from the memory to the storage.

13. The article of manufacture of claim 9, wherein the block of data is transferred from a memory at a first control unit to the memory at a second control unit, and wherein the operations further comprise:

when the second error check indicates that the block of data was corrupted,
  failing the transfer of the block of data by sending sense data to the first control unit; and
  creating a log entry for error analysis.

14. The article of manufacture of claim 13, and wherein the operations further comprise:
  at the first control unit,
    when the second error check indicates that the block of data was corrupted before being transferred from the memory, performing a third error check on the block of data in memory at the first control unit;
    when the third error check indicates that the block of data was corrupted, determining that the block of data was corrupted at the first control unit;
    when the third error check indicates that the block of data was not corrupted, determining that the block of data was corrupted during transfer from the first control unit to the second control unit; and
    creating a log entry for error analysis.

15. The article of manufacture of claim 13, and wherein the operations further comprise:
  at the first control unit, resending the block of data to the second control unit.

16. The article of manufacture of claim 9, wherein the first error check, the second error check, and the third error check are each made using a cyclic redundancy check.

17. A system for fault isolation, comprising:
  means for performing a first error check on a block of data in storage to determine whether the block of data was corrupted after the block of data was transferred from memory to the storage;
  means for, when the first error check indicates that the block of data was corrupted, performing a second error check using the block of data in the memory to determine whether the block of data was corrupted before being transferred from the memory;
  means for, when the second error check indicates that the block of data was corrupted before being transferred from the memory, determining that the block of data was corrupted before being stored in the memory; and
  means for, when the second error check indicates that the block of data was corrupted after being transferred from the memory, determining that the block of data was corrupted by at least one of the memory or a formatter that performed the transfer.

18. The system of claim 17, wherein when the second error check indicates that the block of data was corrupted before being transferred from the memory, further comprising:
  means for retrying the transfer of the block of data from the memory to the storage.

19. The system of claim 17, wherein the block of data is transferred from a memory at a first control unit to the memory at a second control unit, further comprising:
  when the second error check indicates that the block of data was corrupted,
    means for failing the transfer of the block of data by sending sense data to the first control unit; and
    means for creating a log entry for error analysis.

20. The system of claim 19, further comprising:
  at the first control unit,
    means for, when the second error check indicates that the block of data was corrupted before being transferred from the memory, performing a third error check on the block of data in memory at the first control unit;
    means for, when the third error check indicates that the block of data was corrupted, determining that the block of data was corrupted at the first control unit;
    means for, when the third error check indicates that the block of data was not corrupted, determining that the block of data was corrupted during transfer from the first control unit to the second control unit; and
    means for creating a log entry for error analysis.

* * * * *